Jan. 23, 1968  C. R. STELLJES ET AL  3,364,574
WOOD CUTTING SAW BLADE ATTACHMENT FOR HEDGE TRIMMER
Filed Aug. 18, 1966  2 Sheets-Sheet 1

INVENTOR
CHARLES R. STELLJES
GERHARDT A. DOBSLAW
LEONARD CORDONE

BY
Strauch Nolan Neale Nies & Bronaugh
ATTORNEYS

Jan. 23, 1968    C. R. STELLJES ET AL    3,364,574
WOOD CUTTING SAW BLADE ATTACHMENT FOR HEDGE TRIMMER
Filed Aug. 18, 1966    2 Sheets-Sheet 2
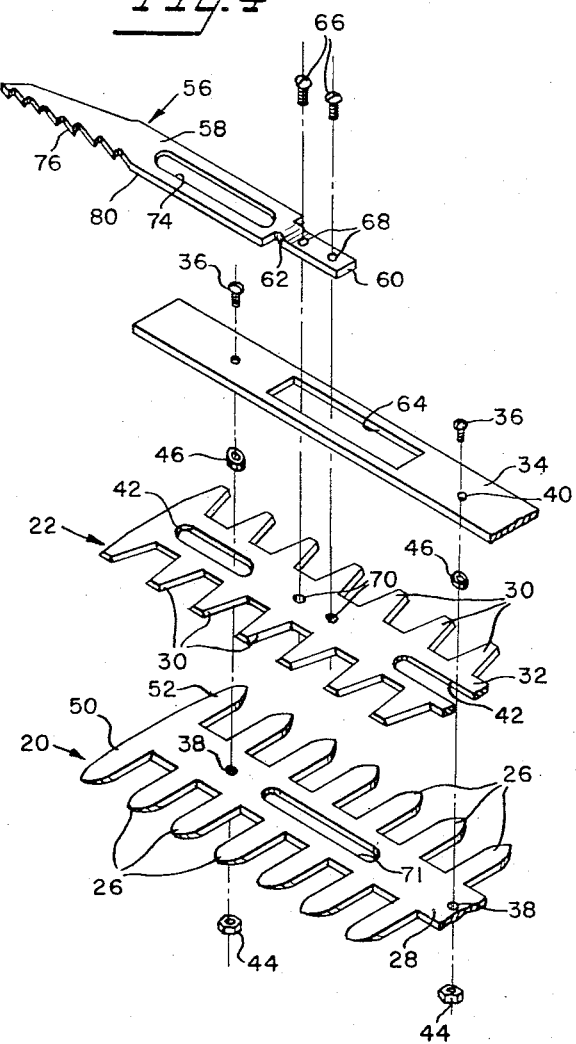
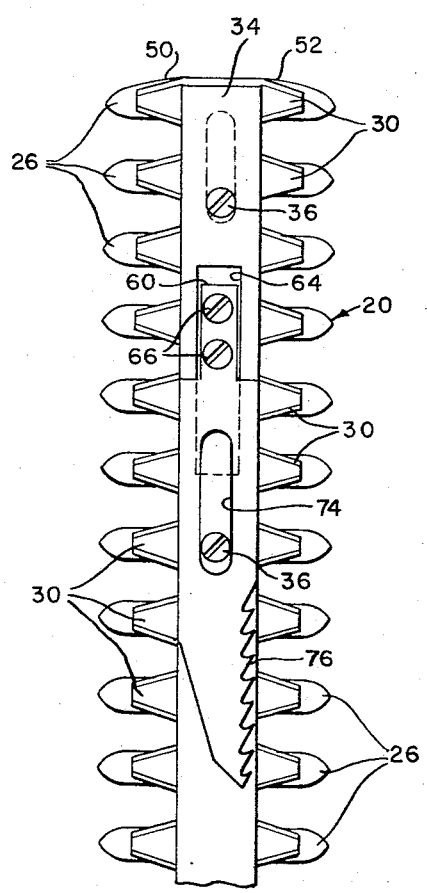
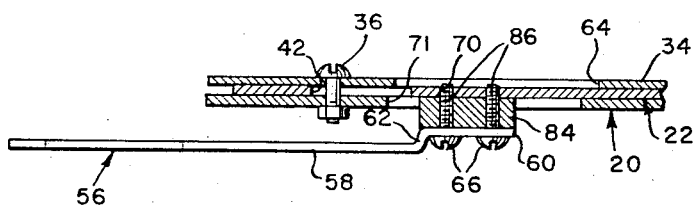
INVENTOR
CHARLES R. STELLJES
GERHARDT A. DOBSLAW
LEONARD CORDONE
BY
Strauch, Nolan, Neale, Nies + Bronaugh
ATTORNEYS

United States Patent Office 3,364,574
Patented Jan. 23, 1968

3,364,574
WOOD CUTTING SAW BLADE ATTACHMENT
FOR HEDGE TRIMMER
Charles R. Stelljes and Gerhardt A. Dobslaw, Fayetteville, and Leonard Cordone, East Syracuse, N.Y., assignors to Rockwell Manufacturing Company, Pittsburgh, Pa., a corporation of Pennsylvania
Filed Aug. 18, 1966, Ser. No. 573,296
7 Claims. (Cl. 30—144)

This invention relates to cutting tools and more particularly to a novel wood cutting, saw blade attachment for a portable, motor driven hedge trimmer.

Conventional hedge trimmers of the type with which this invention is especially concerned have a reciprocably power driven cutter which coacts with a stationary comb to perform a shearing operation. The size of limbs or branches that can be sheared off with this type of tool is limited as a result of the relatively close spacing of the cutting teeth on the comb and the cutter.

To sever thick limbs or branches which are too large in diameter to fit between the cutter and comb teeth, it has been proposed prior to this invention to provide hedge trimmers with wood cutting saw blade attachments. United States Letters Patent No. 3,217,408 issued to Ivar Jepson on Nov. 16, 1965, for a Hedge Trimmer, discloses a typical saw blade attachment which is mounted on the reciprocable cutter so that the trimmer is effective to perform both shearing and sawing operations.

Although combined shearing and sawing tools such as the one described in the Jepson patent are workable, they are subject to certain disadvantages. First, the location of the saw blade attachment and the mounting structure therefor effectively precludes the provision or operative use of teeth along both side edges of the cutter and comb. Second, no provision is made for storing the saw blade attachment in an inoperative position on the cutter.

Accordingly, it is a primary object of this invention to provide a hedge trimmer with an improved wood cutting saw blade attachment which overcomes the above-mentioned disadvantages of prior trimmers.

A more specific object of this invention is to provide an improved saw blade attachment which is novelly mounted on the reciprocable cutter of a hedge trimmer so as not to interfere with the operative use of coacting shearing teeth on both side edges of the trimmer.

Another more specific object of this invention is to provide a novel hedge trimmer saw blade attachment which may be mounted in a reversed, stored position on the reciprocable cutter of the trimmer without interfering with the operative use of coacting cutter and comb shearing teeth on both side edges of the trimmer.

Still another object of this invention is to provide a novel hedge trimmer saw blade attachment which is mountable above or beneath the cutter and comb assembly.

A further object of this invention is to provide an improved hedge trimmer with a wood cutting saw blade attachment wherein the forward most shearing tooth on the stationary comb provides a limb support edge for steadying a limb or branch during a sawing operation.

Another object of this invention is to provide an improved hedge trimmer which has the advantageous features referred to in the previous objects, but which is uncomplicated in construction, relatively inexpensive to manufacture, and easy to assemble and disassemble.

Further objects of this invention will appear as the description proceeds in connection with the appended claims and annexed drawings wherein:

FIGURE 4 is an exploded view of the hedge trimmer parts shown in FIGURE 3;

FIGURE 5 is a plan view similar to FIGURE 3, but showing the saw blade attachment turned 180° to its stored position on the cutter blade; and FIGURE 6 is a fragmentary, partially sectioned elevation of the forward end of the hedge trimmer shown in the previous figures and illustrating the saw blade attachment to be mounted in an inverted position on the underside of the stationary comb or cutter.

Figure 1:
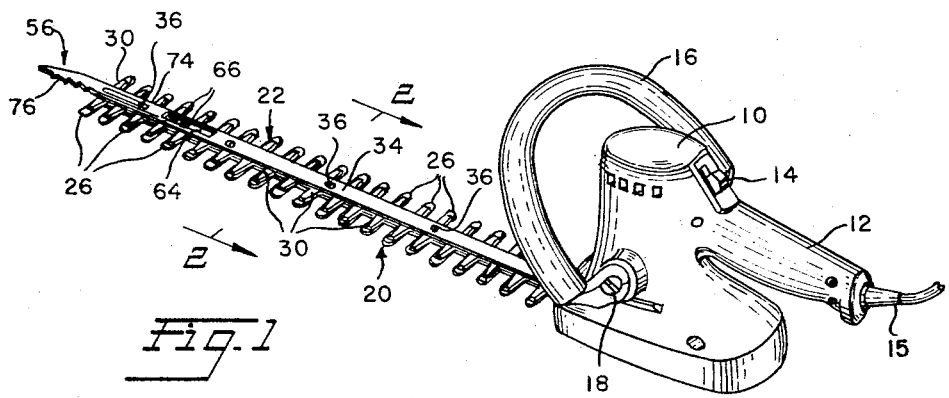
FIGURE 1 is a perspective view of a double-edge hedge trimmer incorporating the principles of this invention.
Figure 2:
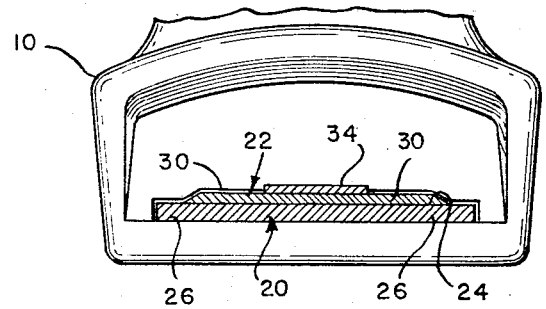
FIGURE 2 is a section taken substantially along lines 2—2 of FIGURE 1.

Referring now to the drawings and more particularly to FIGURES 1 and 2, the portable, power driven hedge trimmer incorporating the principles of this invention is shown to comprise a split housing 10 which contains the cutter drive mechanism including an electric motor and a reciprocating transfer mechanism. These internal cutter drive parts are not illustrated as they are all of suitable, conventional form.

Housing 10 is advantageously formed with a longitudinally and rearwardly extending handle 12 having an elongated, generally cylindrical section which is adapted to be gripped in the palm of the operator's hand. A switch 14 for controlling operation of the motor in housing 10 is mounted at the juncture of handle 12 with housing 10 so that it may be thumb-actuated without requiring the operator to release his grip of handle 12. A sheath covered electric power cord 15 connected to the terminals of switch 14 and the unshown motor extends through handle 12 as shown.

A bowed handle 16 of essentially uniform radius is fixed at opposite ends to housing 10 by screws 18 (one shown in FIGURE 1). Handle 16 extends from opposite sides of housing 10 and is looped around the forward housing wall facing away from the wall from which handle 12 extends. The plane of handle 16 extends at an acute angle with respect to planes containing a stationary comb 20 and a reciprocable cutter 22. When operating the trimmer of this invention, the operator grips the central portion of handle 16 which is located slightly above and forwardly of housing 10.

Figure 3:
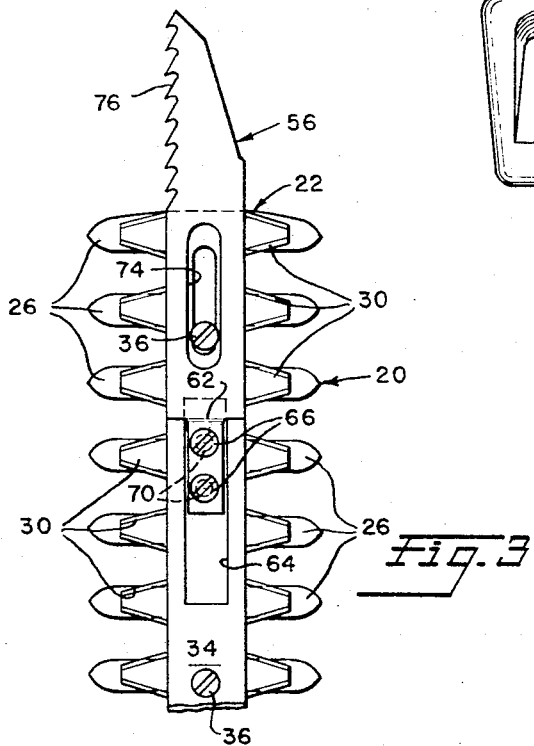
FIGURE 3 is an enlarged plan view of the forward end of the hedge trimmer shown in FIGURES 1 and 2.

Comb 20 is rigidly fixed to housing 10 and extends forwardly through a slot 24 (see FIGURE 2) in the housing front wall. Comb 20 comprises a flat-sided, elongated plate which is formed along both side edges with separate, oppositely extending sets of parallel, equidistantly spaced apart cutter bars or shearing teeth 26. The roots and widths of teeth 26 are uniform as shown in FIGURES 1–3. The plate section of comb 20 between the sets of oppositely extending teeth 26 is indicated at 28 (see FIGURE 4) and is of uniform width. The spacing between adjacent comb teeth on each side edge of comb 20 is uniform and sufficiently wide to allow the entrance of twigs, branches, limbs, and other objects to be sheared. Except for the foremost teeth, each of the cutting teeth 26 has forwardly and rearwardly facing cutting edges extending substantially at right angles to the direction in which cutter 22 is reciprocated. The foremost teeth only have rearwardly cutting edges, the forwardly facing edges being blunt.

Cutter 22 is slidably seated in overlapping relationship on comb 20 and comprises an elongated, flat-sided, straight plate which is also formed along both side edges with separate, oppositely extending sets of parallel, equidistantly spaced apart shearing teeth 30. The roots of teeth 30 are substantially uniform and are the same as that of teeth 26. Teeth 30, which are V-shaped, are tapered towards their outer ends, and each have oppositely facing cutting edges extending transversely of the direction in which cutter 22 is reciprocated. The spacing between the teeth on cutter 22 is uniform and closely equal to spacing between the teeth on comb 20. As shown, teeth 26 and 30 are arranged in parallel rows on opposite side edges of the assembly of comb 20 and cutter 22.

The cutter plate section, which is indicated at 32 in FIGURE 4 and which extends between the oppositely extending sets of cutter teeth 30, has a uniform width substantially equal to plate section 28. Plate section 32 overlies plate section 28 so that teeth 26 and 30 are in sliding engagement with each other. An equal number of cutter and comb teeth are provided on each side of the assembly of comb 20 and cutter 22.

Cutter 22, as shown in FIGURE 2, extends through slot 24 and is mounted for reciprocal, lengthwise sliding movement over the illustrated upwardly facing surface of comb 20, with teeth 26 and 30 being in cooperative shearing engagement with each other. The unshown drive mechanism comprising the electric motor in housing 10 is operatively connected to reciprocate cutter 22 in a manner well known in the art.

To retain cutter 22 in close sliding engagement with comb 20, a flat-sided pressure plate 34 (see FIGURE 4) overlying cutter 22 is rigidly fixed to comb 20 by a series of longitudinally spaced apart screws 36, each of which extends through aligned holes 38 and 40 in comb 20 and plate 34 and a slot 42 in cutter 22. The ends of screws 36 project beyond the underside of comb 20 and are threaded into suitable lock nuts 44. Slots 42 are elongated and aligned in the direction in which cutter 22 is reciprocated and are centered between opposite side edges of plate section 32. Each of the screws 36 extends through a sleeve 46 which slidably extends through an associated slot 42 and which butts at opposite ends against the opposed surfaces on plate 34 and plate section 28. The lengths of slots 42 are uniform and sufficiently long to avoid interference with the reciprocation of cutter 22 by engagement with the peripheries of sleeves 46.

With the foregoing construction, it is clear that cutter 22 is confined or sandwiched between comb 20 and plate 34. Comb 20, cutter 22, and plate 34 are contained in parallel, overlapping planes. Plate 34 overlies plate sections 28 and 32 and is provided with a uniform width which may be equal to, but no greater than, the width of plate sections 28 and 32 so that it lies entirely between the roots of the sets of teeth 26 and 30 on opposite side edges of the comb and cutter assembly.

As shown, plate 34 extends substantially the entire length of plate section 28 between housing 10 and the forward edge of comb 20 facing away from housing 10. This forward comb edge is defined by blunt edges 50 and 52 on the foremost ones of teeth 26. Edges 50 and 52 extend approximately at right angles to the direction in which cutter 22 is reciprocated and are integrally joined at their inner ends by the forward edge of plate section 28.

As shown in FIGURES 1–4, a one-piece saw blade 56 is provided for cutting limbs, branches, or other objects which are too large in diameter to be sheared off by teeth 26 and 30. Blade 56, according to this invention, consists of a flat-sided cutting section 58 and a flat-sided tongue section 60 which is integrally joined to section 58 by a transition section 62. Section 60 extends rearwardly from cutting section 58 and is offset relative to section 58 by transition section 62 to provide blade 56 with a stepped configuration. Sections 58 and 60 are contained in parallel planes which are transversely intersected by a plane containing section 62.

As best shown in FIGURES 3 and 4, tongue section 60 is received in a rectangular opening 64 which is formed through plate 34. The underside of tongue section 60 interfittingly seats against the upper surface of plate section 32. A pair of screws 66 extending through longitudinally spaced apart holes 68 in tongue section 60 are threadedly engaged in aligning tapped holes 70 in plate section 32. Saw blade 56 is thus fixed only by screws 66 solely to cutter 22 so as to be unitarily reciprocated therewith.

Opening 64 is elongated in the direction in which cutter 22 is reciprocated and is sufficiently long to avoid abutment of tongue section 60 with the pressure plate. The width of sections 60 and 62 is uniformly slightly smaller than the width of opening 64 to provide an adequate running clearance between the side edges of these saw blade sections and the side edges of opening 64. Opening 64 is formed near the forward end of plate 34 and in this embodiment is shown to be located between the two foremost ones of screws 36. The ends of screws 66 protrude into a slot 71 which is formed in comb 20 and which is elongated in the direction of cutter reciprocation to prevent interference with the reciprocal movement of cutter 22. Slot 71 and opening 64 are longitudinally symmetrical about a center line extending medially of the comb, cutter, and pressure plate assembly.

In the position of parts shown in FIGURES 1–4, cutting section 58 is raised above tongue section 60 and extends over the forward end of plate 34. Tongue section 60 is thus contained in a plane passing through plate 34 whereas cutting section 58 is disposed by transition section 62 in a parallel plane which is raised slightly above the top face of plate 34.

The portion of cutting section 58 overlying plate 34 is provided with a slot 74 into which the enlarged head of the foremost screw 36 freely extends. Slot 74 is elongated in the direction in which cutter 22 is reciprocated and is sufficiently long to provide a running clearance between cutting section 58 and the head of the foremost screw 36.

As shown in FIGURES 1–4, cutting section 58 extends forwardly in a direction parallel to cutter reciprocation and protrudes beyond the forward end of cutter 22 which is remote from housing 10. This forwardly protruding portion of cutting section 58 is integrally formed with a row of saw teeth 76 which are generally pitched toward comb 20 so that the saw blade cutting stroke occurs when cutter 22 is reciprocated towards housing 10. The purpose of pitching teeth 76 in this manner will be explained shortly.

Preferably, saw teeth 76 lie generally in alignment with the direction of cutter reciprocation so that saw blade 56 cuts evenly without vibrating the work. It will be appreciated, however, that the row of saw teeth 76 may be inclined slightly relative to the direction of cutter reciprocation so that each successive saw tooth will have the proper bite into the limb or other part to be severed.

When advanced to its foremost position, the forward edge of cutter 22 is closely flush with, but does not extend beyond, the forward edge of comb 20. When cutter 22 is in its foremost position, therefore, all of the saw teeth 76 will be disposed beyond the forward edge of comb 20 so as to engage and bite into the wood on the rearward stroke of the cutter. When cutter 22 is in its rearmost position, about one-half of the teeth 76 overlie plate 34.

In accordance with this invention, cutting section 58 is so dimensioned and so disposed that it does not extend laterally beyond the oppositely facing side edges of plate 34. Cutting section 58 thus lies entirely between the roots of the sets of teeth 26 and 30 on opposite sides of the cutter and comb assembly. When shearing hedges, shrubbery and the like, therefore, saw blade 56 does not interfere with or diminish the cutting capacity of teeth 26 and 30 on either side of the assembly.

In this embodiment, the rearward region of cutting section 58 extending between teeth 76 and section 62 contains slot 74, is formed with a uniform width, and has side edges which are substantially flush and parallel with the side edges of plate 34. The peaks of teeth 76, as shown in FIGURE 3, advantageously are contained in a generally common plane which is parallel to, but slightly, inwardly offset from the saw blade cutting section side edge which is indicated at 80 in FIGURE 4. The edge on the forward portion of cutting section 58, which faces away from teeth 76, is inclined to provide section 58 with a forwardly extending taper.

When saw blade 56 is engaged with a limb or other part to be severed and is reciprocated, there is a tendency for the limb to become wedged onto the saw blade after a shallow kerf has been made. If this condition occurs, effective sawing cannot be accomplished since the limb will vibrate owing to the reciprocal movement of the saw. This objectionable condition is avoided according to this invention by employing comb edge 50 as a work support rest. Saw teeth 76, being generally pitched towards the end of comb 20 as previously described, will draw the limb or other part towards edge 50 as cutter 22 is stroked rearwardly. The limb will thus seat against edge 50 to be held steady during the sawing operation. Edge 50, being formed on the foremost tooth 26, is sufficiently long to seat it against the limb before the cutter motor is energized to effect reciprocation of saw blade 56.

In operation, cutter 22 and saw blade 56 are reciprocably driven by the unshown mechanism in housing 10. As branches, twigs, limbs, and the like are presented to teeth 26 and 30 on opposite side edges of the cutter and comb assembly they are readily and quickly sheared off especially as a result of the additional cutting capacity afforded by the double edged comb and cutter. Limbs or other parts which are too large to be sheared off by teeth 26 and 30 are easily and quickly cut off by seating edge 50 against the limb and engaging the limb with saw teeth 76. Edge 50 provides a firm, steady rest for the limb during cutting which only occurs during the rearward stroke of blade 56 owing to the pitch of teeth 76.

In further accordance with this invention, saw blade 56 may easily and quickly be mounted in a stored position which, as shown in FIGURE 5, is spaced 180 degrees from the operative position illustrated in FIGURES 1-3. This is accomplished simply by removing screws 66, turning blade 56 through an angle of 180 degrees, and remounting screws 66 to securely fix blade 56 in the stored position on cutter 22.

In its stored position shown in FIGURE 5, cutting section 58 overlies the portion of plate 34 extending rearwardly of opening 64 and does not extend beyond the side edges of plate 34 or the roots of teeth 26 and 30 on either side of the cutter and comb assembly. As shown, slot 74 receives the head of the second foremost screw 36 when blade 56 is in its stored position. Cutting section 58 is parallel to plate 34, and the portion of section 58 containing saw teeth 76 lies between the second and third ones of screws 36. In this stored position, therefore, blade 56 does not project beyond plate 34 and thus is protected against being inadvertently bent or otherwise damaged. By so storing blade 56 on cutter 22, it need not be removed and left in places, such as a workbench, where it may be lost or difficult to find at a later time.

In further accordance with this invention, saw blade 56 may optionally be mounted on the underside of comb 20 as shown in FIGURE 6. This is accomplished by providing a spacer 84 which extends into slot 71 and which is formed with parallel bores 86. Screws 66 are inserted into bores 86 from the underside of the comb and cutter assembly and are threaded into holes 70. Tongue section 60 is thus clamped between the heads of screws 66 and the underside of spacer 84, and spacer 84 is clamped between tongue section 60 and the exposed underside of cutter plate section 32 to space tongue section 60 away from downwardly facing surface of comb 20.

As shown in FIGURE 6, saw blade 56 is inverted so that cutting section 58 is offset below tongue section 60 to extend forwardly in spaced relation to the underside of comb 20. Spacer 84 thus provides sufficient running clearance between cutting section 58 and comb 20. The oppositely facing surfaces of spacer 84, which are respectively seated against tongue section 60 and cutter plate section 32, are parallel so that cutting section 58 is parallel with comb 20, cutter 22 and plate 34.

In this inverted position shown in FIGURE 6, saw teeth 76 now face in the opposite direction as compared with the position illustrated in FIGURES 1-3. In the position shown in FIGURE 6, therefore, edge 52, instead of edge 50, provides the work support edge which is butted against the limb to steady it while sawing. It also will be appreciated that saw blade 56 may be turned 180 degrees from the position shown in FIGURE 6 to be stored in fixed relation to cutter 22 in a manner similar to that described in connection with FIGURE 5.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a power driven hedge cutting device having a housing, a comb fixed to said housing, a cutter mounted for reciprocating motion and extending from said housing in sliding engagement with said comb, unobstructed coacting sets of cutting teeth along oppositely facing side edges of said cutter and said comb and extending to the ends of said cutter and said comb remote from said housing for providing a shearing action upon reciprocation of said cutter, and power means in said housing for reciprocating said cutter, the improvement comprising a saw blade attachment removably secured to the end of said cutter remote from said housing, said attachment having a first portion extending longitudinally of and projecting beyond said remote end and a second portion overlying said cutter, said second portion lying entirely between the cutter teeth roots at opposite edges of said cutter.

2. The power driven hedge cutting device defined in claim 1 comprising a plate member fixed to said comb and extending from said housing in overlying relation to said cutter, said cutter being slidably disposed between said plate member and said comb, means providing an opening in said plate member adjacent to its end remote from said housing, said second portion overlying the remote end of said plate member and having an offset section received in said opening in seating engagement on said cutter, and fastening means fixing said offset section to said cutter.

3. The power driven hedge cutting device defined in claim 2 wherein said comb and said cutter respectively comprise elongated bars slidably engaged with each other along a substantially flat interface, said comb and cutter teeth extending integrally from the opposite edges of their respective bars and being arranged in rows along opposite sides thereof.

4. The power driven hedge cutting device defined in claim 3 wherein said first portion is provided with a row of saw teeth at least along one edge thereof facing at least approximately in the same direction as one of the side edges of said comb, said saw teeth aligning generally in the direction of cutter reciprocation, the endmost tooth in the row of comb teeth extending from said one side edge having a forwardly facing support edge adapted to cooperate with saw teeth to provide a limb engaging work rest during a sawing operation.

5. The power driven hedge cutting device defined in claim 3 wherein the width of the bar of said cutter between teeth roots at opposite edges thereof is at least as great as the width of said saw blade attachment along the entire length of said attachment, said saw blade attachment being removably mounted on said cutter by said fastening means and being positionable and secured to said cutter by said fastening means in a stored location which is angularly displaced 180 degrees from the position where said first portion projects beyond the end of said cutter, whereby said first portion is adapted to overlie said plate member, said saw blade attachment when in said stored location lying entirely between the opposite side edges of said bar of said cutter.

6. The power driven hedge cutting device defined in claim 5 wherein said saw blade attachment is formed as one flat-sided piece, said offset section extending in parallel relation to the remainder of said attachment.

7. The power driven hedge cutting device defined in claim 3 wherein said fastening means comprises at least one part extending through an opening formed in said comb and elongated in the direction of cutter reciprocation to provide unobstructed reciprocation of said cutter, said saw blade attachment being optionally mountable on said part and secured in place by said fastening means on the side of said comb facing away from said cutter.

No references cited.

OTHELL M. SIMPSON, *Primary Examiner*.

R. V. PARKER, JR., *Assistant Examiner*.

Disclaimer 3,364,574.—*Charles R. Stelljes* and *Gerhardt A. Dobslaw*, Fayetteville, and *Leonard Cordone*, East Syracuse, N.Y. WOOD CUTTING SAW BLADE ATTACHMENT FOR HEDGE TRIMMER..Patent dated Jan. 23, 1968. Disclaimer filed July 7, 1969, by the inventors and the assignee, *Rockwell Manufacturing Company*.

Hereby enter this disclaimer to claim 1 of said patent.

[*Official Gazette September 16, 1969.*]